Oct. 9, 1945.    R. G. LE TOURNEAU    2,386,483
POWER STEERING MECHANISM
Filed March 4, 1944    4 Sheets-Sheet 1

INVENTOR
R. G. LeTourneau
BY
ATTYS

Oct. 9, 1945.  R. G. LE TOURNEAU  2,386,483
POWER STEERING MECHANISM
Filed March 4, 1944  4 Sheets-Sheet 2

INVENTOR
R. G. LeTourneau
BY
ATTYS

Oct. 9, 1945.　　　R. G. LE TOURNEAU　　　2,386,483
POWER STEERING MECHANISM
Filed March 4, 1944　　　4 Sheets-Sheet 4

INVENTOR
R. G. LeTourneau
BY
ATTYS

Patented Oct. 9, 1945

2,386,483

UNITED STATES PATENT OFFICE 2,386,483

POWER STEERING MECHANISM

Robert G. Le Tourneau, Peoria, Ill., assignor to R. G. Le Tourneau, Inc., Stockton, Calif., a corporation of California Application March 4, 1944, Serial No. 525,049

14 Claims. (Cl. 180—79.4)

This invention relates to, and it is an object to provide, a unique power steering mechanism for vehicles, and particularly a vehicle assembly which includes a tractor and trailer coupled together by a draft unit in horizontally steerable draft relation, and wherein the tractor and trailer are supported by ground engaging wheels secured thereon in non-steerable relation.

A further object of the instant invention is to incorporate such power steering mechanism in a vehicle assembly which includes a two-wheel tractor, a trailer, and a draft member fixed on the trailer, the tractor being connected to the draft member in horizontally steerable relation; said power steering mechanism being actuated by the tractor engine and operatively connected between the tractor and said draft member whereby to cause relative steering movement therebetween.

An additional object of this invention is to provide a combination, as in the preceding paragraph, wherein the power steering mechanism includes a gear turnably mounted on the tractor and fixed in connection with the draft member so that rotation of the gear causes relative horizontal steering movement of the tractor, there being a reversibly and selectively driven pinion in mesh with said gear.

It is also an object of this invention to embody the same in a vehicle assembly which includes a two-wheel tractor and trailer, and a draft unit coupling the tractor and trailer in vertically inflexible, laterally tiltable, and horizontally steerable relation; the draft unit including a member fixed on tne trailer, and the power mechanism being actuated by the tractor and operatively connected to said draft member in such a manner as to cause relative steering movement of the tractor without restricting relative lateral tilting between the tractor and trailer.

A still further object of the invention is to provide a vehicle assembly, as in the preceding paragraph, wherein the draft unit includes a ball and socket unit, one element of the ball and socket unit being fixed on the draft member, and the other element being fixed on the tractor; the power steering mechanism including means to impart positive relative rotation to the elements of said ball and socket unit without limiting universal movement thereof in directions laterally of the tractor.

This invention also has for an object the provision in a vehicle assembly which includes a tractor and trailer coupled by a draft unit in horizontally steerable relation, and wherein the tractor is of two-wheel type and includes a self-locking differential unit, of a power steering mechanism connected between the tractor and said draft unit operative to steer the tractor independently of its wheels and said differential unit.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 6 is a diagrammatic plan view of the final drive of the tractor, and including the self-locking differential unit.

Figure 1:
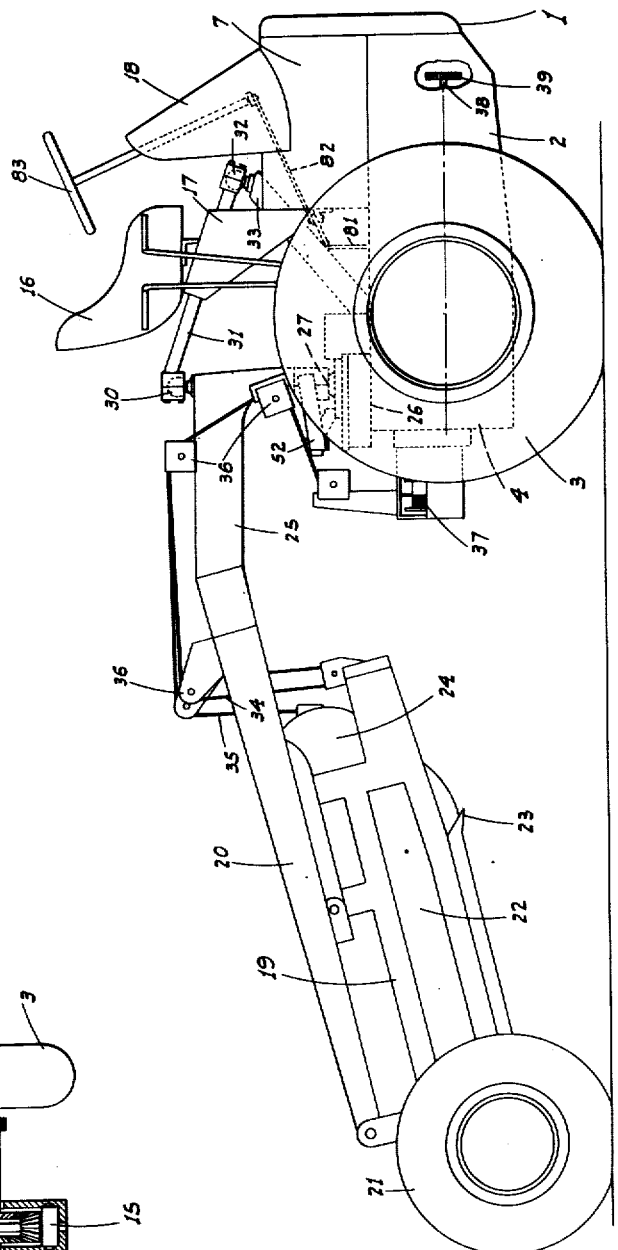
Figure 1 is a side elevation of a vehicle assembly embodying the invention.

Referring now more particularly to the characters of reference on the drawings, the vehicle assembly here shown as embodying the invention comprises a two-wheel tractor, indicated generally at 1, and which includes a frame 2 supported between a pair of transversely spaced pneumatic tired wheels 3 and projecting forwardly in ground overhanging relation. The rear end portion of the frame 2 is formed as a case or housing 4, in the sides of which the wheel axles 5 are journaled.

An engine 6 is mounted in the forward portion of the frame 2 and is enclosed by a hood 7. A change speed transmission 8 projects rearwardly from the engine 6 and is disposed within the housing 4; the final drive assembly between the transmission 8 and the axle 5 being illustrated diagrammatically in Fig. 6. Such drive assembly includes a longitudinal drive shaft 9 connected in driving relation by means of a pinion and ring gear unit 10 with a differential 11. Differential shafts 12 project laterally from opposite sides of the differential 11 and drive pinions 13 mesh with relatively large diameter drive gears 14 on axles 5 within housing 4. The differential 11 includes an automatic or self-locking unit 15 operative to lock the shafts 12 together in positive driving relation upon one wheel or the other losing traction and spinning.

The two-wheel tractor includes an operator's seat 16 mounted above the frame 2 intermediate the ends of the latter by a suitable mount 17. An upstanding leg guard 18 is mounted on the hood 7 ahead of the seat 16.

In the present vehicle assembly, the trailer is an earth carrying scraper, indicated generally at 19, such scraper comprising a longitudinally extending main frame 20 supported at its rear ends by a pair of transversely spaced pneumatic tired wheels 21, and a liftable earth carrying body 22 including a cutting blade 23. The body 22 is fitted adjacent its forward end with a vertically movable earth retaining apron 24. The frame 20 includes, in rigid relation therewith, a central and forwardly projecting draft member or gooseneck 25 whose forward end is vertical and disposed above the deck 26 of housing 4. The gooseneck 25 is connected with the tractor so as to dispose the latter in vertically inflexible, laterally tiltable, and horizontally steerable relation to the trailer, by means of the following arrangement:

A ball and socket unit, indicated generally at 27, is connected between the lower end of the forward portion of gooseneck 25, and the deck 26 of housing 4 adjacent its rear end and centrally of its sides. The socket 28 is mounted rigid on the gooseneck 25, while the ball 29 is mounted rigid with the deck 26 in the manner as will hereinafter appear.

Another ball and socket unit 30 is mounted on the upper end of the forward or vertical portion of the gooseneck 25, and is connected by a draw bar 31 with a still further ball and socket unit 32 mounted on the upper end of a post 33 which upstands from the frame 2; the draw bar 31 sloping downwardly and forwardly beneath the operator's seat 16 and the seat mount 17 straddling the same. The form of draft connection here employed between the tractor and trailer functions in substantially the same manner as the device shown in co-pending application, Serial No. 508,115, filed October 29, 1943, now Patent No. 2,355,893, issued Aug. 15, 1944.

The scraper body 22 and associated apron 24 are raised and lowered as desired by a pair of cables 34 and 35, respectively, which pass over suitable guide sheaves 36; such cables leading from and being actuated by separate drums of a two-drum power control unit or winch, indicated generally at 37, and which power control unit is mounted on the rear end of housing 4. This power control unit is driven by means of a counter-shaft 38 which extends alongside the engine 6 and lengthwise through the housing 4, projecting out of the rear end of the latter and being suitably connected in driving relation with said power control unit. At its forward end the shaft 38 is driven from the engine crank-shaft by a gear train 39.

As the above described vehicle assembly includes ground engaging wheels, both on the tractor and trailer, which are non-steerably mounted, and as the wheels 3 of the tractor may both be positively driven when the self-locking device 15 in the differential is in operation, making it impossible to use friction clutches as the steering means, the following power steering mechanism is employed:

The ball 29 of the ball and socket unit 27 includes a vertically elongated neck or hub 40 formed at its lower end with an enlarged circular flange 41 which is rigidly secured by bolts 42 to the deck 26 of the housing 4. A relatively large diameter, segmental gear 43 surrounds hub 40 in rotatable relation, such gear being supported from said hub 40 by anti-friction bearings 44. A circular case 45 mounted on top of the deck 26 surrounds gear 43, and such case includes a part circle removable top plate 46 secured in place by cap screws 47.

The gear 43 and the socket 28 of the ball and socket unit 27 are fixed together against relative rotation but without limiting lateral rocking of said socket relative to the ball 29 by the following arrangement:

A ring 48 surrounds hub 40 and is fixed to the upper end of the hub 49 of the gear 43. A spindle 50 which includes a downwardly offset shank 51 is fixedly secured to the ring 48 and projects horizontally and radially of the ball 29; said spindle being disposed some distance radially outwardly of said ball. A generally U-shaped yoke 52 straddles the socket 28 and includes alined inwardly projecting trunnions 53 which engage in matching bores in opposite sides of said socket. The cross leg 54 of the yoke 52 includes a horizontal bore 55 through which the spindle 50 projects in close fitting but relatively turnable relation.

With the above described connection between the gear 43 and socket 28, it will be seen that any rotation of the gear 43 relative to the deck 26 of housing 4 will be transmitted to the socket 28 without limiting lateral rocking movement of said socket relative to the ball 29.

Figure 2:
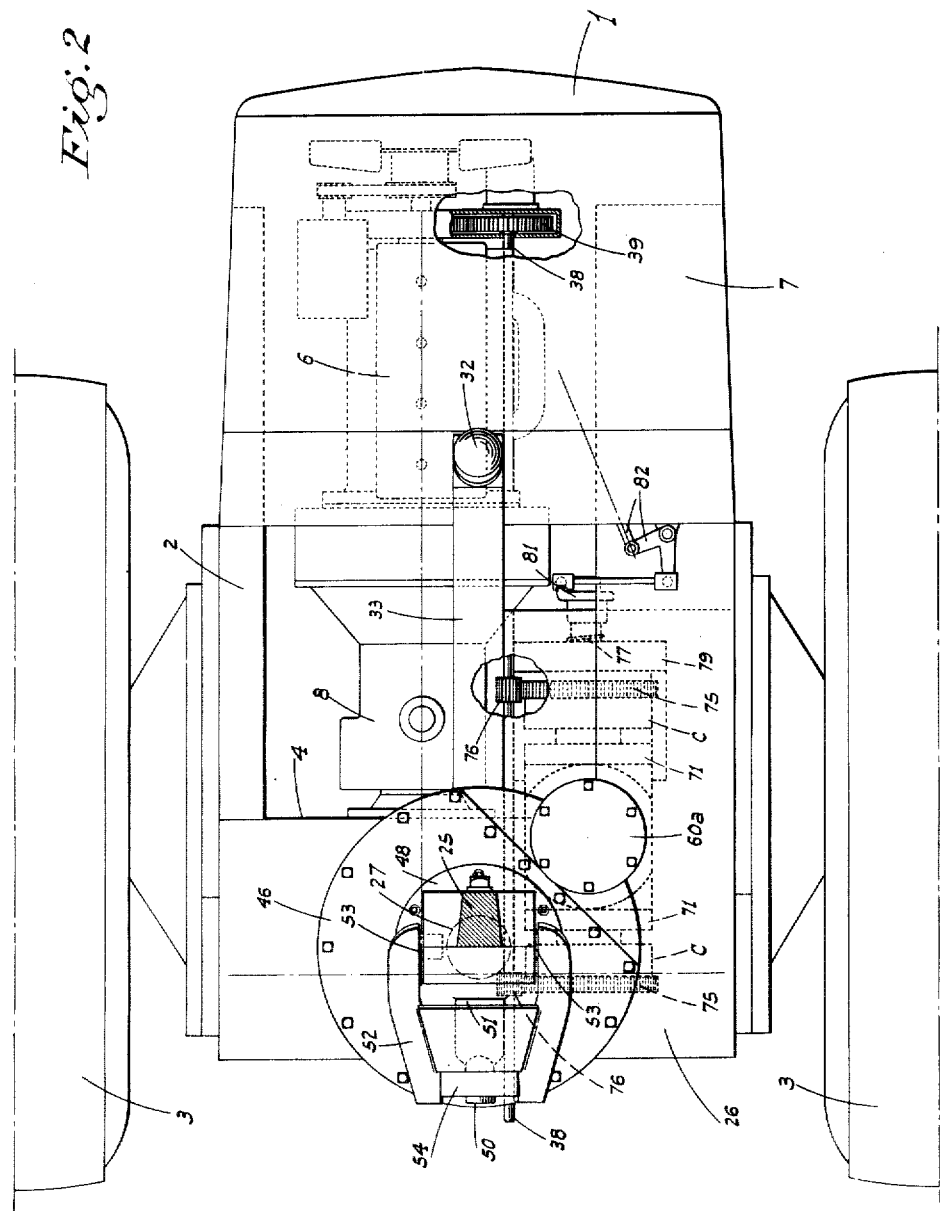
Figure 2 is a top plan view of the tractor, with certain of the superstructure omitted, uncoupled from the trailer, and showing in general the positioning of the power steering mechanism relative to the power plant of the tractor.
Figure 3:
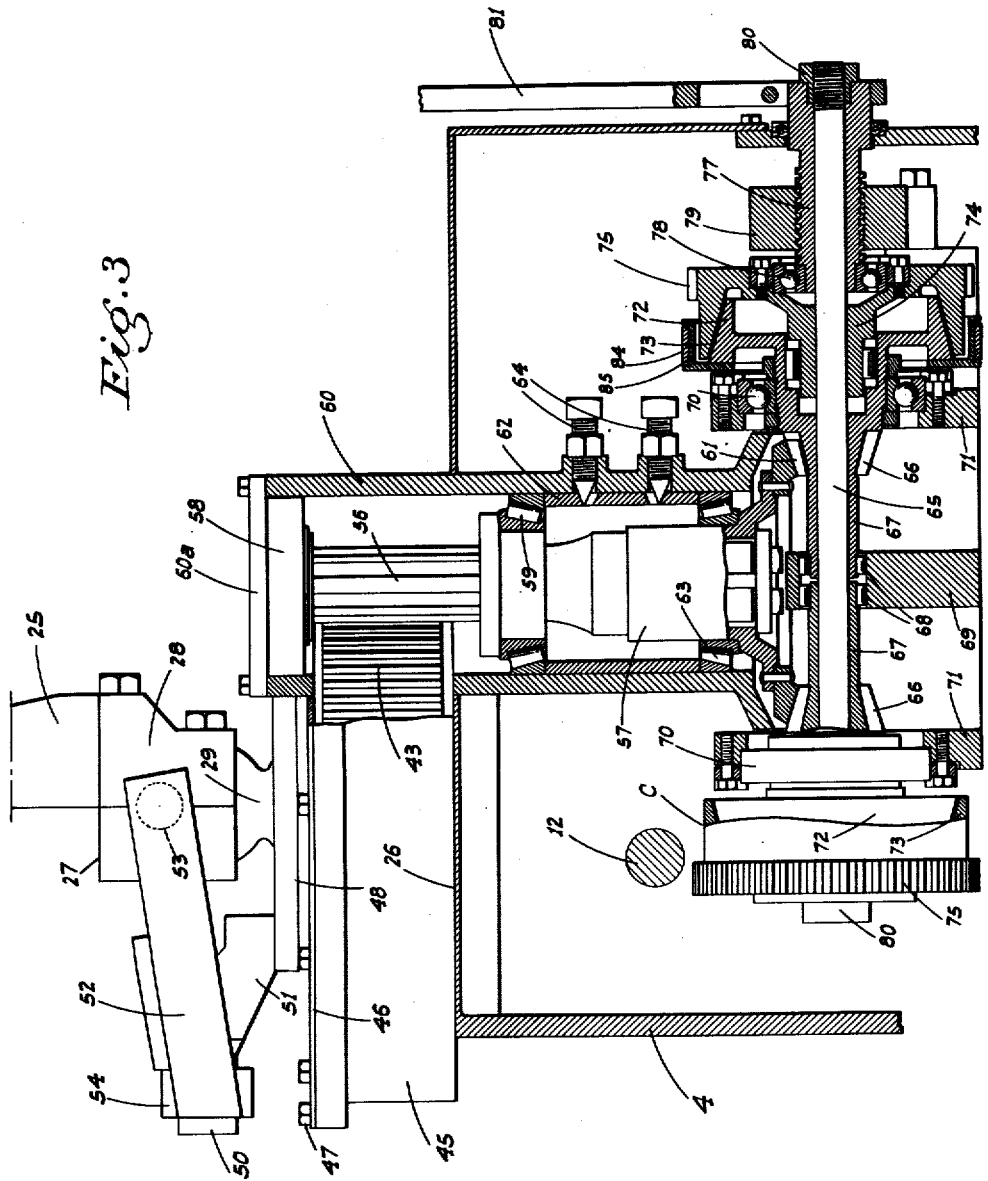
Figure 3 is an enlarged elevation showing, in section, the power steering mechanism.
Figure 4:
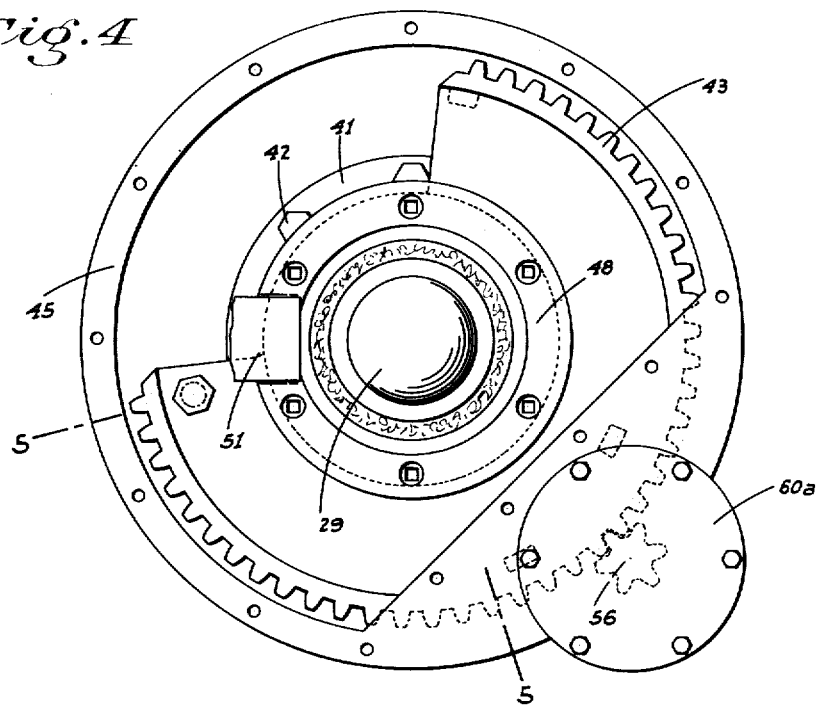
Figure 4 is an enlarged top plan view of the actuating gear assembly of the steering mechanism.
Figure 5:
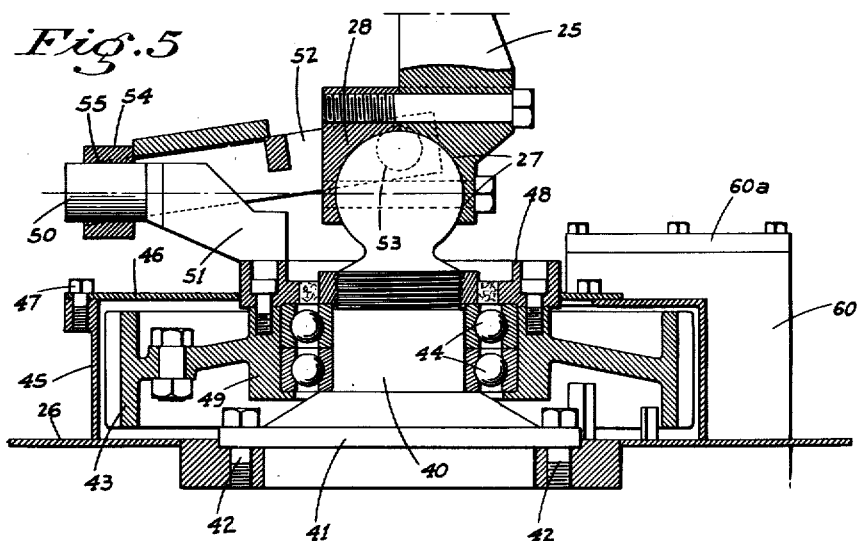
Figure 5 is a sectional elevation on line 5—5 of Fig. 4.

The gear 43 meshes with a pinion 56 formed on the upper end of a vertical spindle 57; such spindle being carried above and below pinion 56 by bearings 58 and 59, respectively, mounted in a vertical tubular column 60 which extends from within the housing 4 upwardly through the deck 26 to a termination slightly above the top of case 45, such column being provided with a removable cover plate 60a. As clearly shown in Fig. 2, the spindle 57 and its enclosing column 60 are disposed in laterally offset relation to the longitudinal center line of the tractor and on the same side as the constantly driven countershaft 38. Likewise the spindle 57 is disposed some distance ahead of the differential shafts 12.

The pinion 56 is selectively and reversibly driven from the countershaft 38 by an operator controlled mechanism which will hereinafter be described in detail. Upon driving of the pinion 56, and consequent turning of the gear 43 in one direction or the other, a relative rotation is effected between the ball 29 and its socket 28. As the socket 28 is fixed relative to the trailer (here scraper 19) and as the ball 29 is fixed on the tractor, the above relative rotation between socket 28 and ball 29 produces steering movement in a horizontal plane of the tractor relative to the trailer; the direction of steering movement being dependent upon and controlled by the direction of rotation of the pinion 56.

The operator controlled power mechanism for selectively and reversibly driving spindle 57 is disposed in housing 4 and comprises a horizontally disposed bevel gear 61 fixed on the lower end of said spindle; the latter being held in vertically adjustable position in column 60 by means of a cage which includes a sleeve 62, bearing 59, and another bearing 63 immediately above bevel gear 61. The sleeve 62 is secured in adjusted position by a pair of set screws 64 threaded through column 60 and seating in recesses in said sleeve.

A horizontal, longitudinally extending shaft 65 extends centrally beneath bevel gear 61, and opposed bevel pinions 66 journaled on said shaft mesh with said bevel gear 61 on opposite sides. The bevel pinions 66 each include hubs 67 axially elongated in both directions, adjacent ends of said hubs being journaled in bearings 68 supported by a frame part 69. At their outer or opposite ends, the elongated hubs 67 are journaled in axially immovable relation in bearings 70 supported by other frame parts 71. Beyond the bearings 70 the hubs 67 are each formed with the axially outwardly facing male element 72 of an annular cone clutch C and an axially inwardly facing female element 73 cooperates therewith. The female element 73 of each clutch C includes a hub 74 on shaft 65 in slidable and turnable relation.

The female elements 73 of clutches C are each formed with an external ring gear 75 constantly in mesh with a pinion 76 on countershaft 38, whereby said clutch elements 73 are continually power driven.

The female clutch elements 73 are spaced apart a greater distance than the male elements 72* so that clutches C cannot be simultaneously engaged; selective engagement of said clutches being accomplished by axial shifting movement of shaft 65 and elements 73 in one direction or the other. This is accomplished by a shifting sleeve 77 turnably surrounding one end portion of shaft 65, and attached at the inner end in relatively rotatable relation to the end portion of the adjacent hub 74 by means including a bearing 78; said shifting sleeve being threaded through a fixed block 79 included in the frame parts of the mechanism. A nut 80 is threaded on the outer end of shaft 65 and abuts the adjacent end of the sleeve, and a similar nut on the other end of the shaft ties the shaft to the corresponding member 73 and prevents axial movement relative thereto.

A radial lever 81 is secured to and upstands from shifting sleeve 77 and is operatively connected by actuating linkage 82 with a steering wheel unit 83 upstanding in front of the driver's seat 16.

When the vehicle assembly is moving and the operator desires to turn in one direction or the other, he correspondingly turns the steering wheel 83, which causes swinging movement of lever 81 in a corresponding direction. When the lever 81 swings in such direction, the shifting sleeve 77 rotates and effects longitudinal movement of shaft 65 and clutch elements 73, and engagement of one of the clutches C. When this occurs, power from the countershaft 38 is transmitted through such engaged clutch to the corresponding one of the bevel pinions 66 and thence to the spindle 57. Upon rotation of the spindle 57 and its pinion 56, the gear 43 is turned and steering of the tractor relative to the trailer is accomplished in the manner previously described.

Such relative steering movement between the tractor and trailer is positive or forceful, and can be accomplished whether the self-locking differential unit 15 is in operation or not.

In order to maintain the tractor in position relative to the trailing unit, a constantly set brake band 84 is mounted in connection with one of the frame parts 71 and engages a flanged brake drum 85 fixed with one of the male clutch elements 72. This exerts a constant drag on said element and parts connected therewith and prevents undue ease of rotation of spindle 56 when the steering mechanism is in neutral.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a tractor, a trailer, a draft unit coupling the tractor to the trailer in laterally tiltable, horizontally steerable relation, said draft unit including a draft member fixed against horizontal movement relative to the trailer, a ball and socket unit connecting said member to the tractor, one element of the ball and socket unit being fixed on the member and the other element being fixed on the tractor, and power steering mechanism connected with said one element of the ball and socket unit operative to effect relative movement between said elements in a direction to result in relative steering between the tractor and trailer; said mechanism including a device arranged to permit said mechanism to function without restricting relative lateral tilting between said tractor and trailer.

2. In combination, a wheeled tractor, a trailer, a draft unit coupling the tractor to the trailer in laterally tiltable, horizontally steerable relation, said draft unit including a draft member fixed against horizontal movement relative to the trailer, a vertically disposed ball and socket unit connecting said member to the tractor, one element of the ball and socket unit being non-rotatably fixed on the member and the other element non-rotatably fixed on the tractor, and power steering mechanism connected with said one element of the ball and socket unit operative to effect relative rotation between said elements and resultant relative steering between the tractor and trailer; said mechanism including a device arranged to permit said mechanism to function without restricting relative lateral tilting between said tractor and trailer.

3. In combination, a wheeled tractor, a trailer, a draft unit coupling the tractor to the trailer in steerable relation, said draft unit including a draft member fixed against horizontal movement relative to the trailer, a vertically disposed ball and socket unit connecting said member to the tractor, one element of the ball and socket unit being non-rotatably fixed on the member and the other element non-rotatably fixed on the tractor, and power steering mechanism connected with said one element of the ball and socket unit operative to effect relative rotation between said elements and resultant relative steering between the tractor and trailer; the ball and socket unit permitting relative lateral tilting between the tractor and trailer, and said power steering mechanism including rotation transmitting means connected with said one element without limiting universal movement of said elements laterally of the tractor.

4. A combination as in claim 3 in which said last named means comprises a yoke straddling said one element of the ball and socket unit, opposed, inwardly projecting trunnions on the legs of the yoke projecting into matching bores in opposite sides of said one element, a power driven ring mounted on the tractor adjacent and in axial alinement with the ball and socket unit, a substantially horizontal spindle projecting in relatively turnable relation through the cross member of the yoke in radial relation to the ball and socket unit, and an offset shank on said spindle fixedly secured to the ring.

5. In combination, a tractor, a trailer, a draft unit coupling the tractor to the trailer in steerable relation, said draft unit including a draft member fixed against horizontal movement relative to the trailer, a vertically disposed ball and socket unit connected between said draft member and the tractor, one element of the ball and socket unit being fixed on the member and the other element being fixed on the tractor, a heavy duty gear mounted on the tractor in axial alinement with said ball and socket unit, power actuated operator controlled means to selectively and reversibly drive said gear, and rotation transmitting means connected between said gear and said one element of the ball and socket unit.

6. In combination, a tractor, a trailer, a draft unit coupling the tractor to the trailer in steerable relation, said draft unit including a draft member fixed against horizontal movement relative to the trailer, a vertically disposed ball and socket unt connected between said draft member and the tractor, one element of the ball and socket unit being fixed on the member and the other element being fixed on the tractor, a heavy duty gear mounted on the tractor in axial alinement with said ball and socket unit, power actuated operator controlled means to selectively and reversibly drive said gear, and rotation transmitting means connected between said gear and said one element of the ball and socket unit; said one element comprising the socket and said other element the ball of the ball and socket unit, and said rotation transmitting means comprising a yoke straddling the socket, opposed trunnions projecting inwardly from the legs of the yoke into matching bores in opposite sides of said socket, a ring secured concentric to said gear, a substantially horizontal spindle projecting in relatively turnable relation through the cross member of the yoke radially of the ball and socket unit, and an offset shank rigidly connecting said spindle and ring.

7. In combination, a tractor, a trailer, a draft unit coupling the tractor to the trailer in laterally tiltable, horizontally steerable relation, said draft unit including a draft member fixed against horizontal movement relative to the trailer and pivotally connected at its foward end to the tractor for relative horizontal steering movement of the latter, and a power steering mechanism mounted on the tractor and connected with said draft member operative to effect said relative steering movement of the tractor; said power steering mechanism including a heavy duty gear, rotation transmitting means between the gear and said draft member, said rotation transmitting means including a device arranged to permit said means to function without restricting relative lateral tilting between the tractor and trailer, a spindle having a pinion in mesh with said gear, and operator controlled reversible drive means connected in driving relation to said spindle.

8. In combination, a tractor, a trailer, a draft unit coupling the tractor to the trailer, the draft unit being fixed against horizontal movement relative to the trailer and the tractor being steerable relative to said draft unit, and tractor engine actuated power steering mechanism connected between the tractor and draft unit operative to steer the latter; said mechanism including a steering spindle adapted to be driven, a drive gear on said spindle, separate pinions in mesh with said gear on opposite sides whereby to reversibly drive said spindle, a drive assembly for each pinion including a normally disengaged clutch, one member of each clutch being arranged in driving connection with the corresponding pinion and the other member being power driven, and operator controlled means to selectively engage said clutches.

9. In combination, a tractor, a trailer, a draft unit coupling the tractor to the trailer, the draft unit being fixed against horizontal movement relative to the trailer and the tractor being steerable relative to said draft unit, and tractor engine actuated power steering mechanism connected between the tractor and draft unit operative to steer the latter; said mechanism including a horizontally disposed gear turnably mounted on the tractor, rotation transmitting means between the gear and draft unit, a vertical steering spindle adapted to be driven and having a pinion at one end in mesh with said gear, a bevel gear on the other end of said spindle, opposed drive assemblies disposed adjacent said bevel gear including bevel pinions in mesh therewith on opposite sides, the drive assemblies being axially alined and each including a cone clutch, one member of each clutch being constantly driven and the other member connected in driving relation with the corresponding bevel pinion, and operator controlled means to selectively engage said clutches.

10. In combination, a tractor, a trailer, a draft unit coupling the tractor to the trailer, the draft unit being fixed against horizontal movement relative to the trailer and the tractor being steerable relative to said draft unit, and tractor engine actuated power steering mechanism connected between the tractor and draft unit operative to steer the latter; said mechanism comprising a horizontally disposed gear turnably mounted on the tractor, rotation transmitting means between the gear and draft unit, a vertical steering spindle having a pinion at one end in mesh with said gear, a bevel gear on the other end of said spindle, opposed drive assemblies disposed adjacent said bevel gear including bevel pinions in mesh therewith on opposite sides, the drive assemblies being axially alined and each including a cone clutch, one member of each clutch being constantly driven and the other member connected in driving relation with the corresponding bevel pinion, and operator controlled means to selectively engage said clutches; said last named means including an axially shiftable control shaft extending through said drive assemblies, a sleeve threaded through a fixed part and surrounding the shaft in shiftable relation thereto, a lever connected to said sleeve to turn the latter, and operating connections between said lever and the operator's station on the tractor.

11. In combination, a two wheel tractor including a deck adjacent its rear end, a trailer having a forwardly projecting draft member, means including a vertical pivotal connection between the forward end of the draft member and the tractor deck coupling the tractor and said member in horizontally steerable, laterally tiltable relation, a horizontal gear turnably mounted on the tractor in adjacent axially alined relation to said pivotal connection, universal rotation transmitting means between said gear and the draft member, a drive pinion in mesh with the gear, and an operator controlled reversible drive assembly actuated by the tractor engine and including said pinion.

12. In combination, a wheeled tractor, a trailer, a draft unit on the trailer, coupling means connecting the tractor to the draft unit in steerable relation, and power actuated means, including the draft unit in part, connected between the tractor and draft unit operative to steer the tractor independently of its wheels; said coupling means connecting the tractor and draft unit in laterally tiltable relation to each other, and said power actuated means being operative without restricting said relative lateral tilting movement.

13. In combination, a tractor, a trailer, a draft unit on the trailer, coupling means connecting the tractor and draft unit in laterally tiltable, horizontally steerable relation to each other, and a power actuated steering mechanism connected between the tractor and draft unit operative to cause relative steering movement of the tractor without restricting said relative lateral tilting movement between the tractor and draft unit.

14. In combination, a tractor, a trailer, a draft unit on the trailer, coupling means connecting the tractor and trailer in laterally tiltable horizontally steerable relation to each other, said coupling means including a part fixed relative to the tractor and a cooperating part fixed relative to the draft unit, and a power actuated steering mechanism operatively connected with said cooperating part to effect relative movement between said parts in a direction to result in steering between the tractor and draft unit without restricting said relative lateral tilting movement therebetween.

ROBERT G. LE TOURNEAU.

Disclaimer 2,386,483.—*Robert G. Le Tourneau*, Peoria, Ill. POWER STEERING MECHANISM. Patent dated Oct. 9, 1945. Disclaimer filed Mar. 22, 1950, by the inventor and the assignee, *R. G. Le Tourneau, Inc.*

Hereby enter this disclaimer to claims 12 and 13 of said patent.

[*Official Gazette April 25, 1950.*]

cluding a vertical pivotal connection between the forward end of the draft member and the tractor deck coupling the tractor and said member in horizontally steerable, laterally tiltable relation, a horizontal gear turnably mounted on the tractor in adjacent axially alined relation to said pivotal connection, universal rotation transmitting means between said gear and the draft member, a drive pinion in mesh with the gear, and an operator controlled reversible drive assembly actuated by the tractor engine and including said pinion.

12. In combination, a wheeled tractor, a trailer, a draft unit on the trailer, coupling means connecting the tractor to the draft unit in steerable relation, and power actuated means, including the draft unit in part, connected between the tractor and draft unit operative to steer the tractor independently of its wheels; said coupling means connecting the tractor and draft unit in laterally tiltable relation to each other, and said power actuated means being operative without restricting said relative lateral tilting movement.

13. In combination, a tractor, a trailer, a draft unit on the trailer, coupling means connecting the tractor and draft unit in laterally tiltable, horizontally steerable relation to each other, and a power actuated steering mechanism connected between the tractor and draft unit operative to cause relative steering movement of the tractor without restricting said relative lateral tilting movement between the tractor and draft unit.

14. In combination, a tractor, a trailer, a draft unit on the trailer, coupling means connecting the tractor and trailer in laterally tiltable horizontally steerable relation to each other, said coupling means including a part fixed relative to the tractor and a cooperating part fixed relative to the draft unit, and a power actuated steering mechanism operatively connected with said cooperating part to effect relative movement between said parts in a direction to result in steering between the tractor and draft unit without restricting said relative lateral tilting movement therebetween.

ROBERT G. LE TOURNEAU.

Disclaimer 2,386,483.—*Robert G. Le Tourneau*, Peoria, Ill. POWER STEERING MECHANISM. Patent dated Oct. 9, 1945. Disclaimer filed Mar. 22, 1950, by the inventor and the assignee, *R. G. Le Tourneau, Inc.*

Hereby enter this disclaimer to claims 12 and 13 of said patent.

[*Official Gazette April 25, 1950.*]